3,347,707
CHARGED SECONDARY CELL
James Southworth, Jr., Rocky River, and Robert E. Stark, Avon Lake, Ohio, assignors to Union Carbide Corporation, a corporation of New York
No Drawing. Continuation of application Ser. No. 336,043, Jan. 6, 1964. This application June 23, 1966, Ser. No. 560,012
5 Claims. (Cl. 136—28)

This application is a continuation of the application of James Southworth, Jr. and Robert E. Stark, Ser. No. 336,043, filed Jan. 6, 1964, now abandoned, for Charged Secondary Cell pursuant to Commissioner's Notice of Feb. 11, 1966, 824 O.G. 1.

This invention relates to rechargeable electrolytic cells. More particularly, this invention relates to rechargeable cells that are assembled in a charged state.

In conventional methods of manufacture for secondary cells the cell usually is assembled in a discharged state, cycled several times with an excess of electrolyte present, the electrodes than are brought to the desired state of charge either electrolytically or chemically, thereafter the electrolyte amount is adjusted, and the cell sealed. It is readily apparent that the foregoing is a cumbersome and time-consuming procedure.

Furthermore, the electrodes of prior art cells comprise a sintered substrate holding an active mass which is introduced therein by impregnation. Again an expensive and time consuming operation is necessary in order to produce a satisfactory electrode.

It is the principal object of the present invention to simplify the manufacturing techniques of secondary cells and to provide a charge-bearing cell.

It is a further object to provide a secondary cell which requires no formation.

It is still another object to provide a hermetically-sealed secondary cell which employs pressed-powder electrodes.

Additional objects will readily present themselves to one skilled in the art upon reference to the ensuing specification and the claims.

The objects of this invention are achieved by a secondary cell which comprises, as assembled, a container, a means for hermetically sealing the container, and charge-bearing pressed powder electrodes containing an active mass situated within the container. The electrodes are made from a powdered active mass pressed into an expanded metal grid, the powdered active mass being substantially contained within the openings of the metal grid. Within the casing the electrodes are juxtaposed relative to each other and have a tough, resilient separator which is resistant to electrolyte deterioration interposed therebetween and in intimate contact with the lateral faces thereof. An electrolyte is present in the cell, but is held substantially "immobilized," i.e., absorbed, within the pressed-powder electrodes and within the separator. The positive electrode of the cell is always maintained under compression, the pressure being at least about 300 p.s.i. but not exceeding about 700 p.s.i. A pressure in the range from about 400 to about 500 p.s.i. is preferred.

Furthermore, the relative amounts of active mass within each electrode are important as set forth in U.S. Pat. 2,571,927 issued on Oct. 16, 1951 to G. Neumann et al. In the instant case the total charge-accepting capacity of the negative electrode must exceed that of the positive electrode by at least about 10 percent and the charged portion of the useful capacity of the negative electrode must be at least equal to the charged portion of the useful capacity of the positive electrode. Also, the positive electrode must contain, in addition to a positively active mass, a predetermined amount of a cathodically-reducible mass as disclosed in U.S. Pat. 2,934,581 issued on Apr. 26, 1960 to A. Dassler.

As used herein and in the appended claims the term "useful capacity" means the actual output measured in ampere hours or its equivalents of a given electrode in a secondary cell subjected to normal service. The foregoing term encompasses both the charged and the uncharged portions of the electrode. In the alternative, the useful capacity can be considered as the product of the theoretical capacity and the efficiency of an electrode.

As used herein and in the appended claims the term "charge-accepting capacity" means the capacity of the uncharged portion of the useful capacity of an electrode, expressed in ampere-hours or its equivalent.

The term "active mass" as employed herein and in the appended claims means material contained within an electrode and intended to enter into a chemical and/or electrochemical reaction during some stage of the operation of a cell.

The term "oxide" as used herein and in the appended claims is taken to encompass, in addition to binary oxygen compounds, also the corresponding hydroxides, the corresponding oxyhydroxides or mixed oxides-hydroxides, and the corresponding hydrous oxides.

The reference to the valency state of the metal in any of the above oxides should be taken as indicating the average valency of the metal in the oxide.

The terms "charged electrode" and "charged cell" as used herein and in the appended claims are taken to encompass both fully-charged and partially-charged electrodes and cells.

The charged, pressed-powder electrodes are the crux of the instant secondary cell. These electrodes employ an expanded metal grid having openings therein. Usually the grid comprises a plurality of metal strands integrally joined at junctures therebetween; however, the grid can also have a honeycomb structure or the like. The essential requirements of the grid are that it contain "pockets" or openings capable of receiving the powdered active mass which comprises the electrodes and that it be capable of retaining the active mass substantially within the openings once pressure is applied to the grid and the grid is plastically deformed. The grid itself must be an electrical conductor since it serves as an internal current collector for the electrode.

Metal grids suitable for the purposes of the present invention can be made by a proper stretching of a metal strip containing a plurality of substantially unidirectional slits. The walls of the grid which form openings or "pockets" in the grid are preferably substantially normal to the plane of grid.

Any metal can be employed as long as it is relatively inert with respect to the normal chemical and electrochemical reactions within the cell. For example, steel and nickel are commonly employed as the materials of construction in a nickel-cadmium system. Since the conditions at the cadmium electrode are primarily reducing, the selection of the grid material is less critical than for the nickel-containing electrode. At the positive electrode, however, a more oxidation resistant material is preferred. Typical of such materials for the nickel-containing electrode are nickel or nickel-coated steel.

For a nickel-cadmium secondary cell the charged active mass of the positive electrode is a nickel oxide having a relatively high oxygen content. For a chemically-charged cell the charged portion of the positively-active mass is made up of a trivalent nickel oxide which can be beta-nickelic oxide, gamma-nickelic oxide, delta-nickelic oxide and lambda-nickelic oxide. Preferably the delta-nickelic oxide or the lambda-nickelic oxide are employed, and the remainder of the positive active mass is nickelous oxide. The trivalent nickel oxide can be present in the positive electrode in an amount up to about 100 percent of the useful capacity of the cell. While it is preferred to have the maximum possible amount of trivalent nickel oxide present in the positive electrode, the amount can also be as low as about 10 percent of the useful capacity of the electrode and the remainder nickelous oxide.

The delta-nickelic oxide and the lambda-nickelic oxide are preferred for the purposes of the present invention because of their relatively high oxygen content and stability.

The delta and lambda nickelic oxides can be represented by the formula $Ni_2O_x \cdot YH_2O$. In the case of delta nickelic oxide $x$ has a value from about 2.8 to about 3.3 and Y has a value from about 1 to about 6. For lambda nickelic oxide $x$ has a value from about 3.3 to about 3.9 and Y has a value from about 1 to about 6. The delta-nickelic oxide is characterized by the X-ray diffraction pattern shown in Table I below.

TABLE I.—RELATIVE PEAK INTENSITIES OF X-RAY DIFFRACTION LINES IN DELTA AND BETA CRYSTAL TYPES OF NICKELIC OXIDE

|  | 4.68 | 2.57 | 2.35 | 1.77 | 1.41 |
|---|---|---|---|---|---|
| | | Samples of Delta $Ni_2O_3$ | | | |
| Peak d in A | 100 | | 26 | | 7 |
| | 100 | | 25 | | 7 |
| | 100 | | 40 | | 11 |
| | 100 | | 26 | | 5 |
| | 100 | | 39 | | 17 |
| | 100 | | 37 | | 12 |
| | | Samples of Beta $Ni_2O_3$ | | | |
| ASTM Card 6-0141 | 100 | | 80 | | 80 |
| Glemser (Infra) | 100 | | 70 | | 70 |

Table I presents the relative intensities and the position in angstroms of the peaks in the X-ray diffraction pattern of six samples of delta nickelic oxide as compared to the X-ray diffraction pattern of the previously known beta nickelic oxide. The beta nickelic oxide patterns are taken from Glemser et al., Z. Anorg. Chem., 261 (1950), pp. 26–42, and from American Society for Testing Materials, X-ray diffraction pattern card number 6–0141. The relative intensity values in Table I are calculated on the basis of the intensity of the strongest line in each pattern as being equal to 100 and the other lines in proportion thereto. Table I clearly illustrates the difference in the degree of crystal perfection which distinguishes the delta form of nickelic oxide from the beta form and indicates that these two crystal types are properly regarded as different entities.

This form of the nickelic oxide can be prepared by oxidizing any nickelous oxide with an oxidizing agent such as an alkali metal hypochlorite, for example. The only requirement is that the oxidation-reduction potential of the oxidizing agent under the reaction conditions is higher than that of the end product, i.e., the delta-nickelic oxide.

The lambda-nickelic oxide is characterized by the diffraction pattern shown in Table II below.

oxide patterns are taken from American Society for Testing Materials, X-ray pattern card number 6–0075, and from a sample of the gamma material. Here again, it is apparent that the gamma and lambda crystal types are properly considered as different entities.

In comparison with this the delta crystal type is characterized by a 2.35 line which is between 25 and 40 percent of the 4.68 line and a 1.41 line which is between 5 and 17 percent of the 4.68 line. Such differences in crystal perfection are considered significant characteristics in the identification of a crystal material.

The delta nickelic oxide is characterized as a poorly crystalline hexagonal system having an X-ray diffraction pattern characterized by the reflections set forth in Table I and the characteristic ratios of relative intensities. In all cases the delta crystal type is characterized by having a much smaller ratio between the most prominent line and each of the minor lines than the beta form. For example both the 2.35 and the 1.41 line are 80 percent of the 4.68 line for beta nickelic oxide.

The lambda nickelic oxide is characterized as a poorly crystalline hexagonal system having an X-ray diffraction pattern characterized by the reflections and intensities set forth in Table II. In comparing the gamma and lambda crystal patterns it is apparent that the gamma material is characterized by a number of lines which do not appear in the lambda pattern. Moreover, the intensity of the lines that do appear in the lambda pattern show a substantially smaller ratio between the various lines and the strongest line in the pattern, i.e., the 7.11 line.

The particular X-ray technique and/or the instruments employed, the humidity, the temperature, the orientation of the powder crystals and many other variables, all of which are well known and understood to those skilled in the art of X-ray crystallography can cause minor variations in both the intensity and the position of the lines. These variations even when relatively large pose no problem to the skilled X-ray crystallographer in establishing the identities of the crystal types involved. The X-ray data given herein to identify the various crystal types are not to exclude materials which fail to show all the lines or perhaps show a few extra ones that are permissible and consistent with a poorly crystallized hexagonal system. Similarly, slight variations of the line position are within the acceptable parameters of the crystal structure.

The lambda-nickelic oxide can be prepared by precipitating, at room temperature or above, nickelous hydroxide from a nickel salt solution (for example, $NiSO_4$) by sodium hydroxide or potassium hydroxide, thereafter aging the resulting precipitate for about 24 hours or more and at a pH in the range from about 9 to about 14, and then oxidizing the aged precipitate with an excess of sodium hypochlorite or the like. The product thus obtained is either a mixture of delta- and lambda-nickelic oxide or lambda-nickelic oxide alone, depending on the amount of sodium hypochlorite present. The larger the excess, the more lambda-nickelic oxide will be present. A more exhaustive description of the methods of preparation of delta- and lambda-nickelic oxides can be found TABLE II.—RELATIVE PEAK INTENSITIES OF X-RAY DIFFRACTION LINES IN LAMBDA AND GAMMA CRYSTAL TYPES OF NICKELIC OXIDE

| Crystal Type | 7.11 | 3.54 | 2.44 | 2.39 | 2.19 | 2.12 | 1.91 | 1.79 | 1.60 | 1.47 | 1.41 | 1.39 | 1.35 | 1.32 |
|---|---|---|---|---|---|---|---|---|---|---|---|---|---|---|
| Lambda | 100 | 27 | | 13 | | | | | | | 22 | | | |
| Do | 100 | 34 | | 32 | | 10 | | | | | 21 | | | |
| ASTM Card * 600075 gamma | 100 | 80 | 10 | 80 | 5 | 80 | 10 | 80 | 10 | 10 | 60 | 60 | | 10 |

* Data from Glemser and Einerhand.
NOTE.—A line beneath the relative intensity indicates a broad peak.

Table II shows X-ray diffraction patterns of two samples of lambda nickelic oxide as compared to the X-ray diffraction pattern of gamma nickelic oxide. The gamma nickelic in co-pending application Ser. No. 336,025, filed of even date in the names of N. C. Cahoon and F. J. Krivanek having a common assignee.

In addition the positive electrode contains a cathodically-reducible mass which serves to present hydrogen generation at the positive electrode in the event a polarity-reversal is experienced within the cell, for example, in an instance where the cell is over-discharged. The cathodically-reducible mass often referred to as anti-polar mass, does not disturb the function of the positive active mass during normal charging and discharging of the cell. The cathodically-reducible mass can be present in the positive electrode in any amount; preferred amounts are those having a useful capacity in the range from about 10 to about 60 percent of the useful capacity of the positive active mass. The exact amount of the cathodically-reducible mass present in the positive electrode can vary and is dependent primarily on the type of service to which the cell will be subjected. In a nickel-cadmium secondary cell cadmium oxide or cadmium hydroxide normally is employed as the anti-polar mass.

If desired, the electrical conductivity of the positive electrode can be enhanced by the addition of a conductive powder such as graphite or metallic nickel. The electrode can contain up to about 55 percent by weight, and generally about 20 to 40 percent by weight, of conductive powder. Similarly, short synthetic fibers can be admixed with the electrode components so as to hold the powdered materials together. Typical fibers for this purpose range from 3 to 24 denier, about 1/64" to 1/8" long.

For optimum cell performance it is desirable to have an active material surface area as high as possible. Therefore the active constitutents are chosen in a finely-divided or powdered form. Generally the various finely-divided particles are admixed so as to form a substantially homogeneous mixture which is then pressed or compacted into the metal grid.

It has been found that upon addition of electrolytes and during subsequent charging the positive electrode tends to swell and force some of the active materials out of the metal grid. For this reason and in order to assure long useful cell life the positive electrode must be physically restrained as soon as the electrolyte is added and thereafter during the life of the cell. A holding pressure of at least about 300 p.s.i. is necessary for this purpose. However, extremely high pressures have been found to interfere with the proper pore formation in the positive electrode of the cell and thus are undesirable. The positive electrode should not be subjected to a holding pressure exceeding about 700 p.s.i.

In the negative electrode of the chemically-charged secondary cell employing nickel and cadmium the negative active mass is made up of cadmium metal and cadmium hydroxide which can be introduced into the electrode initially either as cadmium oxide or hydroxide. The cadmium metal is the chemically-charged portion of the active materials and is present in the negative electrode in an amount at least equal in useful capacity to the useful capacity of the trivalent nickel oxide present in the corresponding positive electrode. It is preferred, however, that the amount of cadmium present in the negative electrode exceeds the amount of trivalent nickel oxide in the corresponding positive electrode by at least about 5 percent in useful capacity. This excess of cadmium in the negative electrode (the discharge reserve) is desirable in order to delay the expiration of the negative electrode during over-discharge until the reduction of the anti-polar mass of the positive electrode is well under way.

The uncharged active mass within the negative electrode i.e., the cadmium oxide or hydroxide, is always present in an amount having a greater charge-accepting capacity than the divalent nickel oxide present in the corresponding positive electrode. In this manner an over-charge reserve is provided within the negative electrode which prevents the negative electrode from becoming fully charged and thus eliminates the possibility of hydrogen evolution within the cell upon overcharging. The excess amounts of the charged and uncharged masses within the negative electrode are always chosen so that the useful capacity of the negative electrode within a cell exceeds the useful capacity of the corresponding positive electrode by at least about 10 percent.

If desired, conductive aids such as inert metal or graphite powders can also be employed in the negative electrode.

It is desired that the negative electrode in addition to a high surface area also posseses high porosity for facilitating electrolyte access to the active materials during operation of the cell.

Various techniques can be employed to achieve this end. For example, for the active mass a cadmium powder having large surface area (in the range from about 1.6 to about 2.0 square meters per gram) is chosen. Cadmium metal of this type can be obtained by the reduction of a reducible cadmium compound such as cadmium oxide with aluminum powder in an aqueous alkaline solution. The resulting cadmium is in the form of plate-like and acicular crystals and the metal powder mass remains porous even after compacting because of particle shape irregularities.

A method of preparation of such powdered cadmium metal can be found in U.S. Ser. No. 335,798, filed of even date in the name of R. E. Stark and having a common assignee, now Patent No. 3,297,433.

In an alternate method, in an instance where the cell utilizes an alkaline electrolyte such as KOH, for example, solid alkali metal hydroxide can be admixed with the powdered active mass of the negative electrode and pressed into the expanded metal grid. Upon addition of the liquid electrolyte within an assembled cell the solid alkali metal hydroxide particles are dissolved and a porous negatively active mass is left within the expanded metal grid.

In a further modification of the aforesaid method aluminum powder, an inert conductive powder, and cadmium oxide are admixed and compacted into an expanded metal grid with or without an additional binder. Thereafter the aluminum powder is reacted with the cadmium oxide and with alkali metal hydroxide in an aqueous bath of the alkali metal hydroxide to yield cadmium metal in a porous electrode. The pores are produced by leaching out of the electrode the soluble aluminum reaction products. By suitably adjusting the relative amounts of the various components only part of the CdO in the admixture can be reduced to Cd, if desired, thus giving an electrode having an accurately-controlled ratio of charged to uncharged active mass.

Another important constituent of the secondary cell is the separator between the electrodes. The separator must be tough, resilient, and resistant to electrolyte-degradation. In addition, the separator should be capable of absorbing and retaining a substantial amount of electrolyte while still remaining gas permeable.

Separators found suitable for the present purposes are non-woven batts of felts made of synthetic fibers such as polyamide fibers, polypropylene fibers, or the like.

In general, alkaline electrolytes are contemplated for the hereindescribed secondary\ cells. Particularly preferred electrolytes are aqueous solutions of alkali metal hydroxides, such as aqueous solutions of KOH and NaOH, for example. The concentration of the hydroxide within the electrolyte is not critical and is determined usually by the type of cell and its intended application. Normally a 25 to 35 percent KOH solution in water is employed.

The amount of electrolyte present within the cell is such that all of it is substantially held immobilized within the electrodes and the separator. Again, the exact amount of electrolyte present is determined by the type of cell and the contemplated use. An excess of electrolyte, however, will interfere with the ability of the cell to withstand overcharge. The proper amount in each application is readily determinable by the skilled artisan.

The chemically-charged secondary cell, the elements of which have been fully described hereinabove is manufactured as follows.

An expanded metal grid is provided and suitable powdered mixtures containing active masses in a finely-divided or powdered form are pressed into the openings of the grid. This operation plastically deforms the grid so as to lock the mixtures therein.

The positive electrode powder is packed into the grid usually so as to achieve about 70 percent of the theoretical density of the powdered mixture, i.e., about 30 percent porosity. The porosity of the positive electrode will increase subsequently as it swells upon coming in contact with the electrolyte and also upon cycling of the cell during use.

The mixture comprising the negative electrode is packed into the respective grid to a lesser extent—usually to about 50 percent of the theoretical density of the powder. The negative electrode is then reacted to "charge" it to the desired degree as set forth above and then washed and dried.

The resulting pressed-powder electrodes are then trimmed to the desired dimensions, and contact strips are affixed to the internal current collectors in any convenient manner. When a cell is assembled, a positive electrode is juxtaposed relative to a negative electrode and a separator is placed inbetween the lateral faces of the electrodes and in intimate contact therewith. The entire assembly is held under compression until it is inserted in a container, preferably a tightly-fitting one. Once the electrolyte is added the applied pressure on the positive electrode is in the range from about 300 p.s.i. to about 700 p.s.i.

If it is desired to produce a cylindrical cell, alternate layers of electrodes and separators can be arranged in any suitable manner and then wound spirally or coiled into a roll having the desired dimensions. The aforementioned compressive force can be applied conveniently during the winding operation, and the resulting roll inserted into a container immediately thereafter without a substantial release of the applied pressure.

Once the electrode assembly is inserted into the container a predetermined amount of electrolyte is introduced therein wetting the electrodes and the separator. The container then is hermetically sealed and the cell is ready for use. It should be noted that during the entire cell assembly operation the active materials are in a dry state.

As an example of the practice of the invention the following description of a preferred method of manufacturing D size sealed high rate nickel/cadmium cells using charged pressed powder electrodes is given by way of embodiment. Other cell size may be made in essentially the same manner with appropriate changes in dimensions of parts and components.

The negative mass consisting of essentially dry powders of nickel metal, aluminum metal and cadmium oxide are blended together (e.g. in a twin-shell blender) for 15 minutes. The nickel metal powder provides electrode crush resistance and the aluminum powder serves later as a reducing agent for a part of the CdO. An example of a suitable formula for the negative mass is as follows:

| Ingredients: | Percent by weight |
|---|---|
| Nickel powder | 38.12 |
| Aluminum powder | 5.88 |
| Cadmium oxide | 56.00 |
| | 100.00 |

Nickel expanded metal is used as the electrode carrier grid. The carrier is expanded in continuous lengths from 0.004 or 0.005 inch thick strip metal stock by conventional commercial procedures. After expanding the carrier stock is stretched to increase the overall thickness and enlarge the openings. The finished carrier grid for the negative electrode has an overall thickness of 0.048 inch and a strand width of 0.029 inch.

The carrier grid is degreased to remove oil and dirt before further processing.

The negative electrode is made by passing in a continuous manner the negative mass and the carrier grid in a vertical downward direction between the 14 inch diameter by 30 inch long horizontal rolls of a conventional two roll mill of the type used in powder metallurgy. The metal carrier grid lays curved against the upper surface of one roll and may be held under tension which is not great enough to deform it. The negative mass is metered into the roll gap alongside the metal carrier in such a manner as to fill uniformly the multitude of small openings of the carrier.

The spacing between the mill rolls is adjusted to compact the negative mass in the carrier grid by reducing the overall grid thickness to 0.032 inch. A packing of the active mass of about 53% is obtained by this compacting. The reduction in grid thickness results from bending over the strands of the carrier which effectively locks the negative mass in place.

The aluminum powder is caused to reduce a part of the CdO powder to Cd metal by placing a coil of the anode stock interwound with a strip of corrugated nickel sheet, in the various environments as set forth in Table III. After the reduction reaction, the anode is washed and dried as shown in the table.

TABLE III.—PROCESSING OF CHEMICALLY CHARGED CADMIUM ANODE

| Step No. | Time, Hours | Solution or Environment | Solution Temperature | Special Conditions |
|---|---|---|---|---|
| 1 | 4 | ½ N NaOH | 2° C. (±1°) | Refrigerated ½ N NaOH. |
| 2 | 1 | ½ N NaOH | 20–25° C | Heat to this temperature. |
| 3 | 4 | ½ N NaOH | 85–95° C | Do. |
| 4 | 16 | Demineralized Water | 80–85° C | Demineralized water is allowed to replace the ½ N NaOH at the rate of about 1 liter/min./300 feet of anode. Water in tank is ultrasonically vibrated and recirculated at about 10 liters/min. |
| 5 | 3 | Acetone | 20–25° C | |
| 6 | 2 | Vacuum <200 microns | 200° C | |
| 7 | | 1 Atmosphere | Nitrogen gas | "Break" vacuum with $N_2$. |

*Nickelic oxide cathode (positive electrode)*

A positive mass consisting of essentially dry powders of nickelic oxide, cadmium oxide, graphite, and polyacrylic plastic fibers are mixed together in a mulling type mixer for 15 minutes. The mix is then given a single pass through a pulverizer. An example of a suitable formula is as follows:

| Ingredients: | Percent by weight |
|---|---|
| $Ni_2O_3$ | 69.6 |
| CdO | 7.3 |
| Graphite | 22.6 |
| Polyacrylic plastic fibers | 0.5 |
| | 100.0 |

The positive electrode is made by a rolling process in the same manner as the negative, except that the finished thickness after roll milling is 0.034" and the packing is 74 to 82%.

Finished electrode stock in widths up to 12 inches and coiled for handling is slit into narrow width strips 1.90 inch wide and recoiled.

After slitting, the narrow width strips of electrode stock (both positive and negative) are cut to length. In this operation the electrode is measured off taking account of variations in thickness until a predetermined electrode volume has been obtained at which point the unit electrode is cut off. The unit positive electrodes are cut when a volume of 0.81 cubic inch has been reached. The unit negative electrodes are cut when a volume of .97 cubic inch has been reached. If the nominal packing and electrode thickness values are maintained the unit positive electrode length will be 12.5 inches and the unit negative electrode length will be 16.0 inches. However, the thickness of both positive and negative electrodes may vary as much as ±.002 inch as a function of the roll mill process. Cutting unit electrodes to a predetermined volume permits the use of any unit positive electrode with any unit negative electrode. Thus the proper balance in capacity between electrodes is maintained in every finished cell.

Cut unit electrodes are next prepared for final cell assembly. Solid nickel current collector tabs 0.003 inch thick and 0.25 inch wide are spot welded to the prepared areas of each electrode. The finished positive electrode contains approximately 40 grams of positive mass having a theoretical capacity of 8 ampere hours. The finished negative electrode contains 70 grams of negative mass having a theoretical capacity of 17.5 ampere hours.

One unit positive electrode and one unit negative electrode are assembled with separator strips as follows:

Non-woven nylon felt approximately 0.010 inch thick is used as the separator material. It is first slit to a width of 2.17 inches then cut to length. Three pieces of separator are used for each cell. One piece is cut several inches longer than the positive electrode and one piece is cut several inches longer than the negative electrode. The third piece is cut long enough to more than cover both sides of the negative electrode. A total length of 81 inches of separator strip is used in each cell.

The electrodes and separator lengths are stacked with one piece of separator covering the inner side of the positive electrode and one piece covering the mating inner side of the negative electrode. The third piece of separator covers both outer sides of the flat stacked assembly. Edges of the separator strips extend beyond the edges of the electrodes at both top and bottom.

The jelly roll winding operation is the next process step and is accomplished by winding under pressure the electrode-separator assembly into a coil between horizontal parallel rolls. After winding, pressure is maintained on the jelly roll by the winding rolls as the jelly roll is inserted into the cylindrical container.

The cylindrical container consists of a drawn nickel plated steel can having a wall thickness of 0.010 inch. A thin (0.010 inch) disc of solid nylon resides in the bottom of the container under the jelly roll.

After winding, a 0.005 inch thick nickel current collector strip is spot welded to the inside of the can near the open end and adjacent to the cluster current collector tabs of the negative electrode. This strip is then spot welded to the group of tabs. The cell container then will become the negative terminal of the finished cell.

A vacuum is drawn on the partially completed cell and 14.5 cubic centimeters of 25 percent potassium hydroxide solution is injected into the cell.

The cell closure consists of six parts which include a 0.005 inch thick nickel current collector tab, a nylon gasket, a 0.035 inch thick nickel plated steel cover, a laminated steel and rubber sealing disc, a coil spring, and a cap.

The sealing disc is seated over a small hole in the center of the cover. The coil spring is placed on top of the sealing disc. The cap is placed over the coil spring and spot welded to the cover. The coil spring and sealing disc form a resealable vent which will relieve excessive gas pressure which may develop within the cell on abuse.

The nickel current collector tab is spot welded to the bottom of the cover. The nylon seal is coated with asphalt. The cover assembly is inserted into the flanged rim of the nylon seal with the nickel current collector tab passing through a hole in the center of the nylon seal.

The nickel current collector tab on the cover assembly is spot welded to the clustered current collector tabs on the positive electrode. The cover assembly then becomes the positive terminal of the cell.

The cover assembly nylon seal combination is seated inside the open end of the cylindrical container and the open end of the container crimped over the nylon seal. The cell is then passed through a draw die which reduces the diameter of the container, thereby applying a radial compression to the nylon seal between the container wall and the cover.

The charged cell is now finished and ready for use.

The finished charged cell illustrating a representative embodiment of the invention comprises an assembly of parts briefy described as follows. A tightly wound jelly roll assembly of a central core, a charged positive pressed powder electrode strip, a charged negative pressed powder electrode strip, and several nylon mat separator strips positioned between and around said electrode strips resides in a cylindrical cell container. Extending upwards from the jelly roll assembly are two groups of metal tabs welded to the positive and negative electrodes respectively. A negative connector strip is welded to the negative tabs and to the inner wall of the container. A positive connector strip is welded to the positive tabs and to the underside of the metal top cover. The radially sealed top cover assembly comprises a cupped nylon seal gasket with the positive connector strip passing therethrough, a metal cover with small center hole positioned inside the nylon gasket, a metal cupped and flanged cap welded to the top of the metal cover and containing within the cup a metal coil spring bearing on a laminated steel and rubber sealing disc seated over the small hole in the cover. The nylon mat separator and porous electrodes are understood to be impregnated with the requisite volume of caustic electrolyte, and a thin inert, impervious insulating disk of sheet plastic resides in the bottom of the container.

The foregoing discussion has been directed primarily to nickel-cadmium secondary cells in the interests of clarity and convenience. It will be readily apparent to the skilled artisan that the hereindisclosed advances in the art can be applied equally well to other secondary cell systems, for example, nickel oxide-zinc, manganese dioxide-cadmium, manganese dioxide-zinc, silver oxide-cadmium, silver oxide zinc, and the like, without departing from the spirit and scope of this invention.

We claim:

1. A chemically-charged secondary cell which comprises, in combination, a container; a means for hermetically sealing said container; at least one pressed-powder positive electrode comprising a mixture of a positive active powder, a cathodically reducible powder, and an inert conductive powder compressed into a metal grid and a pressed-powder negative electrode comprising a mixture of a negative active powder with an inert conductive powder compressed into a metal grid, both positive and negative electrodes situated within the container and juxtaposed relative to each other; a tough, resilient separator resistant to electrolyte deterioration interposed between the electrodes and in intimate contact with the lateral faces thereof; and an electrolyte which is an aqueous solution of an alkali metal hydroxide substantially held within the electrodes and the separator; the positive active powder consisting essentially of a stable nickel oxide having a composition represented by the formula $$Ni_2O_x \cdot YH_2O$$

wherein $x$ has a value from about 2.8 to about 3.9 and wherein Y has a value of from about 1 to about 6, and nickelous oxide, said stable nickel oxide and nickelous oxide being in relative amounts such that from about 10 to about 100 percent of the useful capacity of the electrode is represented by said stable nickel oxide and the remainder by the nickelous oxide, the cathodically reducible powder being finely-divided cadmium hydroxide and the negative active powder consisting essentially of cadmium and cadmium hydroxide; the cadmium powder within the negative electrode being present in an amount such that the useful capacity of the cadmium powder at least equals that of said stable nickel oxide present in the positive electrode and the amount of cadmium hydroxide powder in the negative electrode being such that its charge accepting capacity exceeds that of the nickelous oxide present in the positive electrode by at least about 10 percent; and the positive electrode being at all times under compression to the extent of at least about 300 p.s.i., but not exceeding about 700 p.s.i.

2. The cell in accordance with claim 1 wherein the cathodically reducible powder is present in the positive electrode in an amount having a useful capacity in the range from about 10 to about 60 percent of the useful capacity of the positive active mass.

3. The cell in accordance with claim 1 wherein the amount of cadmium powder present in the negative electrode exceeds the amount of said stable nickel oxide in the positive electrode by at least about 5 percent in useful capacity.

4. A chemically-charged secondary cell which comprises, in combination, a container; a means for hermetically sealing said container; at least one pressed-powder positive electrode comprising an expanded metal grid having openings therein and a mixture of a positive active powder, a cathodically reducible powder, and an inert conductive powder compressed and substantially contained within the openings of said metal grid and a pressed-powder negative electrode comprising an expanded metal grid having openings therein and a mixture of a negative active powder with an inert conductive powder compressed and substantially contained within the openings of said metal grid, both positive and negative electrodes situated within the container and juxtaposed relative to each other; a tough, resilient separator resistant to electrolyte deterioration interposed between the electrodes and in intimate contact with the lateral faces thereof; and an electrolyte which is an aqueous solution of an alkali metal hydroxide substantially held within the electrodes and the separator; the positive active powder consisting essentially of a stable nickel oxide having a composition represented by the formula $$Ni_2O_x \cdot YH_2O$$

wherein $x$ has a value from about 2.8 to about 3.9 and wherein Y has a value of from about 1 to about 6, and nickelous oxide, said stable nickel oxide and nickelous oxide being in relative amounts such that from about 10 to about 100 percent of the useful capacity of the electrode is represented by said stable nickel oxide and the remainder by the nickelous oxide, the cathodically reducible powder being finely-divided cadmium hydroxide and being present in an amount having a useful capacity in the range from about 10 to about 60 percent of the useful capacity of the positive active mass, the negative active powder consisting essentially of cadmium and cadmium hydroxide; the cadmium powder within the negative electrode being present in an amount such that the useful capacity of the cadmium powder exceeds that of said stable nickel oxide present in the positive electrode by at least one-half of the useful capacity of the cadmium hydroxide present in the positive electrode and the amount of cadmium hydroxide powder in the negative electrode being such that its charge accepting capacity exceeds that of the nickelous oxide present in the positive electrode by at least about 10 percent; and the positive electrode being at all times under compression to the extent of at least about 300 p.s.i. but not exceeding about 700 p.s.i.

5. The method of making a chemically-charged secondary cell which comprises the steps of:
(a) forming a chemically-charged positive electrode by pressing a powdered mixture comprising a positive active powder, a cathodically reducible powder and an inert conductive powder into the openings of a metal grid and in such manner as to lock the mixture within the grid, the positive active powder consisting essentially of a stable nickel oxide having a composition represented by the formula $$Ni_2O_x \cdot YH_2O$$

wherein $x$ has a value from about 2.8 to about 3.9 and wherein Y has a value of from about 1 to about 6, and nickelous oxide, said stable nickel oxide and nickelous oxide being in relative amounts such that from about 10 to about 100 percent of the useful capacity of the electrode is represented by said stable nickel oxide and the remainder by the nickelous oxide, the cathodically reducible powder being finely-divided cadmium hydroxide;

(b) forming a chemically-charged negative electrode by pressing a mixture comprising a negative active powder and an inert conductive powder into the openings of a metal grid and in such manner as to lock the mixture within the grid, the negative active powder consisting essentially of cadmium and cadmium hydroxide, the cadmium powder being present in an amount such that the useful capacity of the cadmium powder at least equals that of said stable nickel oxide present in the positive electrode and the amount of cadmium hydroxide powder being such that its charge accepting capacity exceeds that of the nickelous oxide present in the positive electrode by at least about 10 percent;

(c) juxtaposing a resulting pressed-powder positive electrode to a resulting pressed-powder negative electrode;

(d) interposing between and in intimate contact with the lateral faces of the electrodes a tough, resilient separator resistant to electrolyte deterioration;

(e) compressing the resulting assembly under a pressure of at least about 300 p.s.i., but not exceeding about 700 p.s.i.;

(f) inserting the compressed assembly into a container without a substantial release of the applied pressure;

(g) introducing a predetermined amount of electrolyte into the electrodes and into the separator; and (h) hermetically sealing the container.

References Cited

UNITED STATES PATENTS

| | | | |
|---|---|---|---|
| 2,131,592 | 9/1938 | Lange et al. | 136—28 X |
| 2,934,581 | 4/1960 | Dassler | 136—9 |
| 3,031,517 | 4/1963 | Peters | 136—6 |
| 3,075,033 | 1/1963 | Salkind | 136—24 |

WINSTON A. DOUGLAS, *Primary Examiner.*

A. SKAPARS, *Assistant Examiner.*